A. F. ROWE.
AUTOMATIC FRICTION CLUTCH BRACKET.
APPLICATION FILED APR. 29, 1912.
1,050,234.
Patented Jan. 14, 1913.
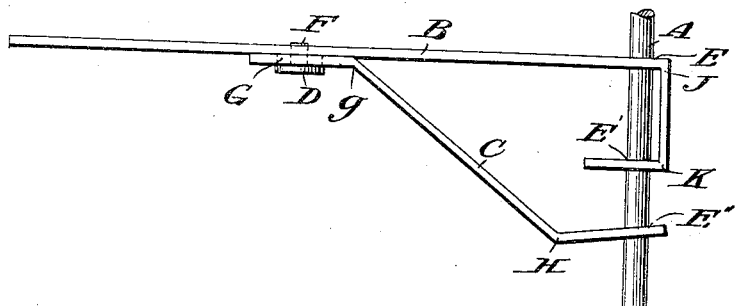
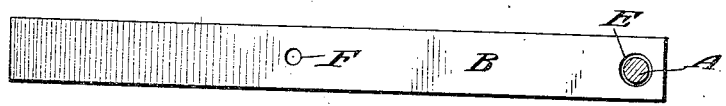
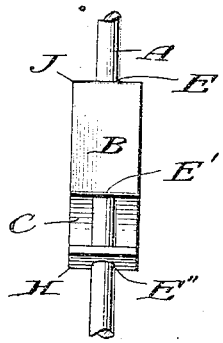
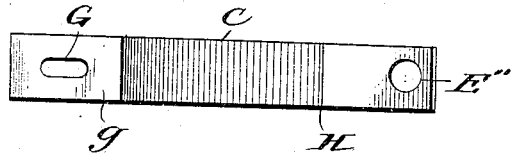
Witnesses:
Verton A. Murray.
Irene Viola Rowe
Inventor:
Arthur Fearon Rowe.

UNITED STATES PATENT OFFICE.

ARTHUR FEARON ROWE, OF PRINCE RUPERT, BRITISH COLUMBIA, CANADA.

AUTOMATIC FRICTION-CLUTCH BRACKET.

1,050,234. Specification of Letters Patent. Patented Jan. 14, 1913.

Application filed April 29, 1912. Serial No. 693,916.

*To all whom it may concern:*

Be it known that I, ARTHUR FEARON ROWE, a citizen of Canada, residing in Prince Rupert, in the county of Atlin, in the Province of British Columbia, Canada, (whose post-office address is Potterville, in the county of Eaton, in the State of Michigan, United States,) have invented certain new and useful Improvements in Automatic Friction-Clutch Brackets, of which the following is a specification.

My invention relates to improvements in adjustable brackets in which an under brace bar forms an automatic friction clutch on a supporting perpendicular rod, when the weight of the upper bar slides the connecting rivet to the end of the slot in the under bar. And the objects of my improvements are: first, to provide a rigid bracket which may be turned from side to side, and may be made in any design suited to the use desired. Second, to provide an instantly adjusted bracket, by taking hold of the outside end or sides of the upper bar or arm and slightly raising the bracket, it may be raised or lowered and becomes rigid or stationary as soon as released. Third, by using only the supporting rod in perpendicular position, the two bars or arms, and a rivet, I have a bracket that is automatic in its clutch on the rod. I attain these objects by the mechanism illustrated in the accompanying drawing, in which—

Figure 1, is a side view of the entire bracket. Fig. 2, is a top view of bar B, and rod A. Fig. 3, is a top view of bar C. Fig. 4, is an end view of the assembled parts. Fig. 5, is a side view of the rivet used.

Similar letters refer to similar parts throughout the several views.

In Fig. 1, A, designates a supporting rod of any desired length and material and geometric form of circumference. The bar or arm B, of any desired size of width, thickness, or length, and material is bent back at J, and K, at one end parallel and having holes E, E', in the main arm and in the bent back part, adapted to receive the supporting rod A, holes E, E', just large enough to allow raising and lowering bar B, on rod A without friction. Arm B, has a hole F, near the other end for receiving projecting rivet D, as required. Bar C, of similar dimensions to bar B, in material, width, thickness, and as much shorter in length as the bracing of the bar B, requires and is provided with slot G, at one end adapted to receive said projecting rivet D, and having hole E'', at its other end adapted to receive supporting rod A, without friction, with bend I, parallel to bar B, and close to slot G. Also bent at H, near hole E'', sufficient to raise the bent end up slightly from the parallel of the end bent at I; when assembled parts are together, bend I, lowers bend H, on rod A, at hole E'', so the ends of bars B, and C, cannot touch each other on rod A.

Rivet D, of any desired material and having flanged head, with body slightly less in diameter than slot G, in bar C, is riveted to bar B, at F. Rivet D, passes through slot G, in bar C, and is of sufficient length to allow slight play of said bar.

The rod A, bars B, and C, and rivet D, constitute the entire working parts of the automatic friction clutch bracket. Pressure being applied to bar or arm B, the brace arm C, is adapted to slide, bringing the rivet D, to one end of the slot G, and causes the arm B and brace C, to form a friction clutch on supporting rod A, at holes E, E', E''.

I am aware that previous to my invention friction clutch brackets have been made with a bar and rod. I therefore do not claim such a combination broadly; but,

I claim:

An automatic friction clutch bracket, having an arm B, bent back at one end and having holes E, E', in the main arm and in the bent back part, adapted to receive a supporting rod A, said arm having a projecting rivet D near the other end, a brace C, having a slot G, at one end adapted to receive said projecting rivet D, and having a hole E'', at its other end adapted to receive the supporting rod A, whereby, upon pressure being applied to the arm B, the brace C, is adapted to slide bringing the rivet D, to one end of the slot G, and allowing the arm B, and brace C, to form a friction clutch on rod A, at points E, E', E''.

ARTHUR FEARON ROWE.

Witnesses:
VESTON A. MURRAY,
IRENE VIOLA ROWE.

Copies of this patent may be obtained for five cents each, by addressing the "Commissioner of Patents, Washington, D. C."